July 22, 1969   E. J. RUSSELL   3,456,404
REMOVABLE AWNING FOR TRAIN WINDOWS
Filed Feb. 15, 1968   2 Sheets-Sheet 1
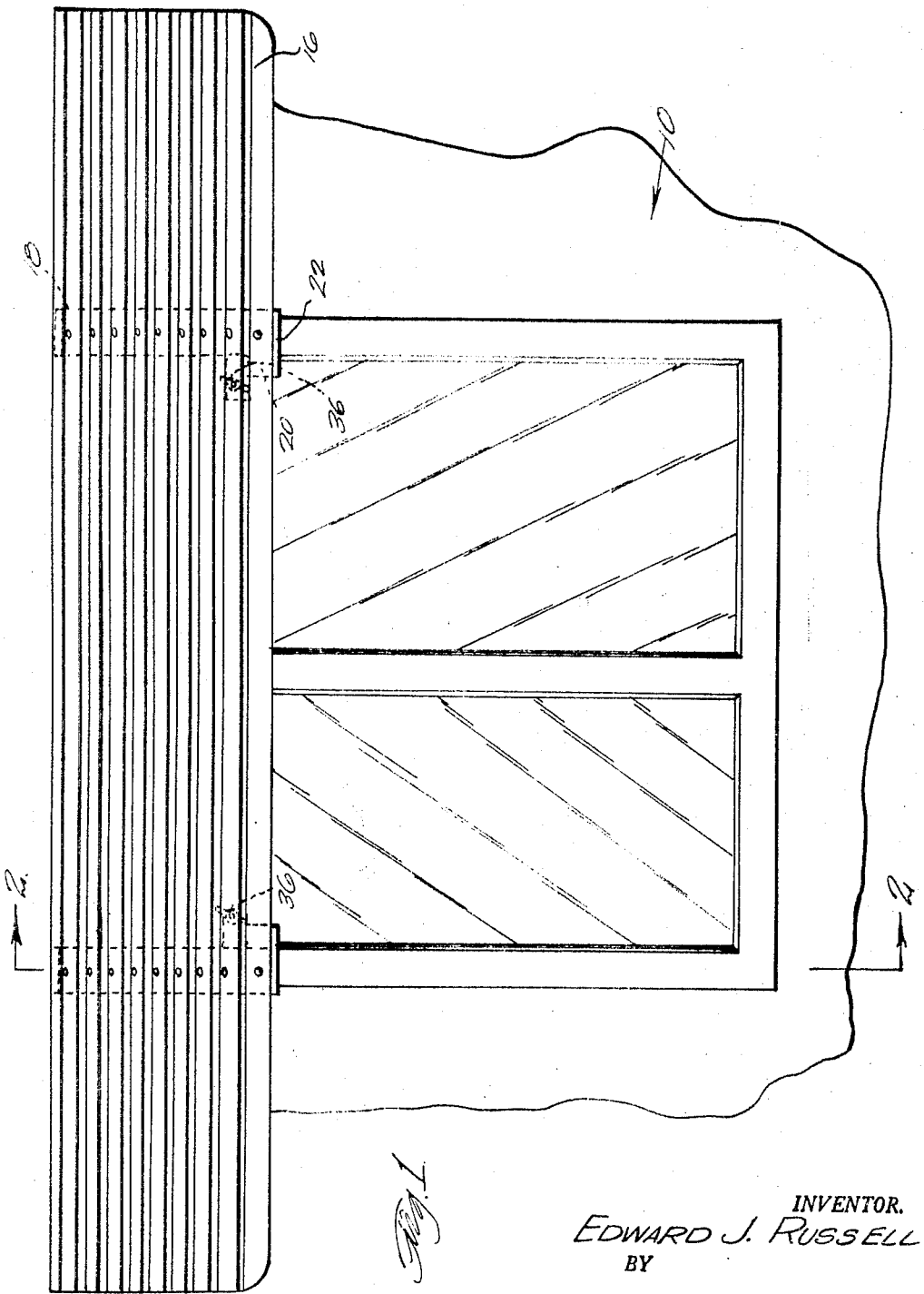
INVENTOR.
EDWARD J. RUSSELL
BY
ATTORNEYS

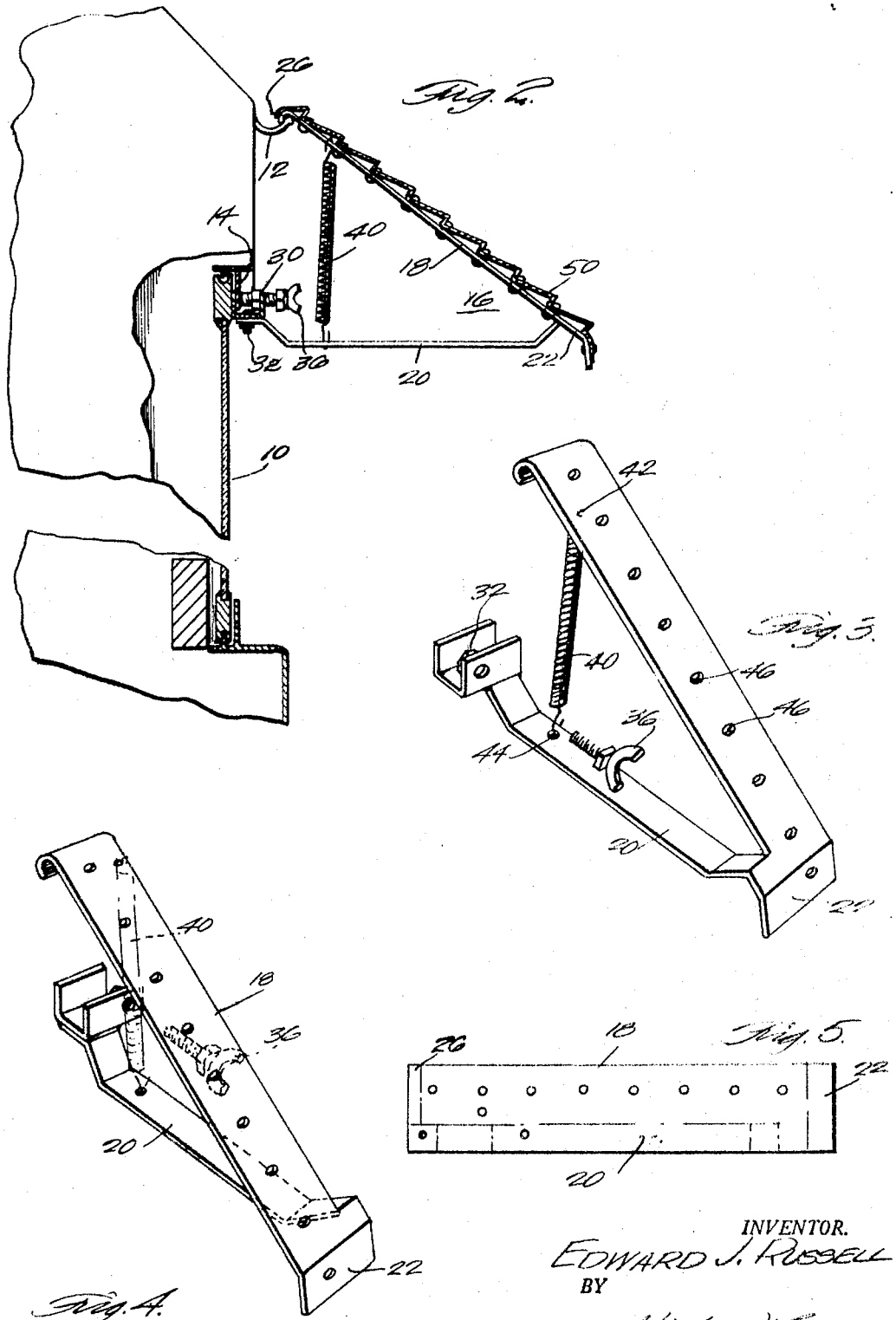

United States Patent Office 3,456,404
Patented July 22, 1969

3,456,404
REMOVABLE AWNING FOR TRAIN WINDOWS
Edward J. Russell, Salisbury, N.C., assignor to
W. C. Smith, Salisbury, N.C.
Filed Feb. 15, 1968, Ser. No. 705,644
Int. Cl. E04b *1/38;* E04g *3/08;* B61d *25/00*
U.S. Cl. 52—78              3 Claims

ABSTRACT OF THE DISCLOSURE

A removable awning for train windows having an inclined and horizontal brace members terminating integrally with a wide section, the free end of the inclined brace having a C-section to clamp on the rain cap or gutter of a locomotive engine, the free end of the horizontal brace connected by a pop rivet to a U-shaped bracket which is clamped by a thumbscrew onto a lower window track of said locomotive engine, and a spring disposed between the inclined and the horizontal braces to hold them in rigid relation when mounted on said locomotive window.

---

The present invention relates to a new and improved removable awning for train windows that is easily mounted and dismounted, and also relates to the improved particulars of the removable awning that has a C-clamp at the upper free end of an inclined brace and a U-shaped bracket means at the free end of the horizontal brace, each for clamping to mating or engaging structures, and in which the horizontal and the inclined braces are integrally connected to a wide section, the braces being biased toward each other by a retractable spring.

An object therefore of the present invention is to provide a particular bracket structure having means for securing an awning in position on a locomotive engine window for use, and which also includes a swivel joint and spring arrangement in combination to adapt the removable awning for quick installation and disassembly from said locomotive window and yet allow the engine window to be closed.

The above and other objects and advantages of the invention will become apparent upon full consideration of the following detailed description and accompanying drawings in which:

FIG. 1 is a front elevation view of the awning which is mounted on the locomotive window in accordance with the preferred embodiment of the invention;

FIG. 2 is a cross-sectional view taken along lines 2—2 of FIG. 1;

FIG. 3 is a detailed perspective view of the inclined-horizontal braces and wide sections as constructed from an integral member with the U-shaped, C-section and spring members, in accordance with the best mode of the present invention;

FIG. 4 shows a symmetrical arrangement or left-handed assembly of that shown in FIG. 3; and FIG. 5 shows a metal strap from which the brace assembly of FIGS. 3 and 4 may be constructed, showing the locations of which are to be drilled and which are to be bent.

Referring now to the drawings, there is shown a locomotive engine window 10 having a rain cap or gutter 12 and a window track 14.

An awning construction 16 formed of an inclined brace 18 and a horizontal brace 20 forming a bracket or brace assembly which is integral in a wide section 22, forms what may be called a split bracket in which the free end of the inclined brace terminates in a C-section 26 to engage the rain cap 12 of the locomotive engine window, and the free end of the horizontal brace 20 terminates in a U-shaped bracket 30 which is pop-riveted by a rivet 32 to the horizontal brace 20, as shown.

The U-shaped bracket 30 is clamped to the window track 14 by a thumbscrew 36, and in order to retain positive bias between the inclined and horizontal braces, a retracting spring or compression spring 40 is provided, having the ends thereof secured or hooked in opening 42, 44 of the inclined and horizontal braces, respectively.

An additional series of apertures or openings 46 may be provided in the inclined brace 18, as shown in FIG. 3, to which the zig-zag awning structure 50 may be conventionally riveted.

FIG. 5 shows the strap and the reference numbers thereon show the corresponding end portions which result from the strap after it has been worked by drilling, cutting and bending, as shown, the end resultant structure being specifically embodied in FIG. 3.

What is claimed is:
1. A removable awning for train windows comprising an inclined brace terminating at the lower end in a wide section a horizontal brace extending integrally from the wide section and terminating at its free end in a U-shaped bracket, said U-shaped bracket having a thumbscrew to clamp the U-shaped bracket with a lower section of a window, the upper free end of the inclined brace having a C-section to engage a rain cap of a locomotive engine; and a spring disposed between the inclined and horizontal braces to clamp the awning onto the window frame.

2. The invention according to claim 1 wherein the zig-zag awning structure is riveted onto the inclined brace.

3. The invention according to claim 1 wherein a pop rivet holds the U-shaped bracket onto the horizontal brace.

References Cited

UNITED STATES PATENTS

| 1,330,518 | 2/1920 | Dalton | 52—74 X |
|---|---|---|---|
| 2,605,520 | 8/1952 | Larson | 52—75 |
| 2,628,807 | 2/1953 | Lincoln | 248—226 |
| 2,742,252 | 4/1956 | Wiesener | 52—74 X |
| 2,749,430 | 6/1956 | Cohn | 248—226 X |
| 3,114,530 | 12/1963 | Shilling | 248—226 |
| 3,259,349 | 7/1966 | Lee | 248—226 X |
| 3,294,438 | 12/1966 | Carson et al. | 248—226 X |

ALFRED C. PERHAM, Primary Examiner

U.S. Cl. X.R.

52—37, 714; 248—208, 226